(12) United States Patent
Thomsen et al.

(10) Patent No.: US 11,243,447 B2
(45) Date of Patent: Feb. 8, 2022

(54) ELECTROCHROMIC DEVICE INCLUDING LITHIUM-RICH ANTI-PEROVSKITE MATERIAL

(71) Applicant: HELIOTROPE TECHNOLOGIES INC., Alameda, CA (US)

(72) Inventors: Scott Thomsen, South Lyon, MI (US); Guillermo Garcia, Oakland, CA (US)

(73) Assignee: HELIOTROPE TECHNOLOGIES INC., Alameda, CA (US)

( * ) Notice: Subject to any disclaimer, the term of this patent is extended or adjusted under 35 U.S.C. 154(b) by 274 days.

(21) Appl. No.: 16/386,390

(22) Filed: Apr. 17, 2019

(65) Prior Publication Data

US 2019/0324340 A1    Oct. 24, 2019

Related U.S. Application Data

(60) Provisional application No. 62/659,992, filed on Apr. 19, 2018.

(51) Int. Cl.
*G02F 1/1523* (2019.01)
*G02F 1/155* (2006.01)
*G02F 1/15* (2019.01)

(52) U.S. Cl.
CPC .......... *G02F 1/1525* (2013.01); *G02F 1/155* (2013.01); *G02F 2001/1555* (2013.01); *G02F 2001/164* (2019.01); *G02F 2202/022* (2013.01); *G02F 2202/09* (2013.01); *G02F 2202/20* (2013.01); *G02F 2202/36* (2013.01)

(58) Field of Classification Search
CPC ............. G02F 1/1525; G02F 1/155; G02F 2001/1555; G02F 2001/164; G02F 2202/022; G02F 2202/09; G02F 2202/20; G02F 2202/36
See application file for complete search history.

(56) References Cited

U.S. PATENT DOCUMENTS

| | | | |
|---|---|---|---|
| 7,150,916 B2 | 12/2006 | Lemmer et al. | |
| 7,521,096 B2 | 4/2009 | Lemmer et al. | |
| 9,864,250 B2* | 1/2018 | Garcia | C03B 27/00 |
| 2016/0017137 A1* | 1/2016 | Kokuryo | C08L 23/12 |
| | | | 525/57 |
| 2017/0329197 A1* | 11/2017 | Yashiro | B29D 11/0073 |
| 2018/0364540 A1 | 12/2018 | Winoto et al. | |

OTHER PUBLICATIONS

Jian Gao, Yu Sheng Zhao, Si-Qi Shi and Hong Li published an article "Lithium-ion transport in inorganic solid state electrolyte", published in Chin. Phys. B vol. 25, No. 1 (2016) 018211, published online Dec. 7, 2015 (Year: 2015).*

* cited by examiner

*Primary Examiner* — Joseph P Martinez
*Assistant Examiner* — Vipin Patel
(74) *Attorney, Agent, or Firm* — The Marbury Law Group PLLC (57) ABSTRACT

An electrochromic (EC) device and method, the EC device including: an optically transparent first substrate; a working electrode disposed on the first substrate and including electrochromic nanoparticles and a flux material having a melting point ranging from about 25° C. to about 500° C.; and an electrolyte disposed on the working electrode. The flux material is configured to prevent or reduce sintering of the nanoparticles at a temperature of up to about 700° C.

19 Claims, 3 Drawing Sheets

ELECTROCHROMIC DEVICE INCLUDING LITHIUM-RICH ANTI-PEROVSKITE MATERIAL

FIELD

The present invention is generally directed to electrochromic (EC) devices including a lithium-rich anti-perovskite (LiRAP) material configured to provide improved electrochemical stability and/or cycle life.

BACKGROUND OF THE INVENTION

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. An electrochromic (EC) window coating overcomes these limitations by enhancing the window performance in all climates. EC window coatings undergo a reversible change in optical properties when driven by an applied potential. Some EC devices may include a working electrode, a solid state electrolyte, and a counter electrode sandwiched between two transparent conductor layers and an outer glass layer. The working electrode may include a metal oxide active material.

SUMMARY OF THE INVENTION

According to various embodiments, provided is an EC device including: an optically transparent first substrate; a working electrode disposed on the first substrate and comprising electrochromic nanoparticles and a flux material having a melting point ranging from about 25° C. to about 500° C.; and an electrolyte disposed on the working electrode. The flux material is configured to prevent or reduce sintering of the nanoparticles at a temperature of up to about 700° C.

According to various embodiments, provided is a method of making an EC device, the method comprising: forming at least a portion of an EC device on an optically transparent first substrate, the EC device comprising a working electrode comprising electrochromic nanoparticles and a flux material having a melting point ranging from about 25° C. to about 500° C.; and heating the first substrate and the working electrode to a temperature of at least 600° C. A bright mode visible light transmittance amount of the EC device before the heating is within +/−15% of a bright mode visible light transmittance amount of the EC device after the heating.

According to various embodiments, provided is a method of making an electrochromic (EC) device, the method comprising: forming at least a portion of an EC device on an optically transparent first substrate, the EC device comprising nanoparticles and a flux material having a melting point ranging from about 25° C. to about 500° C.; heating the nanoparticles such that the flux material melts and prevents or reduces sintering of the nanoparticles; and cooling the nanoparticles such that the flux material solidifies around the nanoparticles.

DETAILED DESCRIPTION OF THE EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being disposed "on" or "connected to" another element or layer, it can be directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

EC Devices

Figure 1:
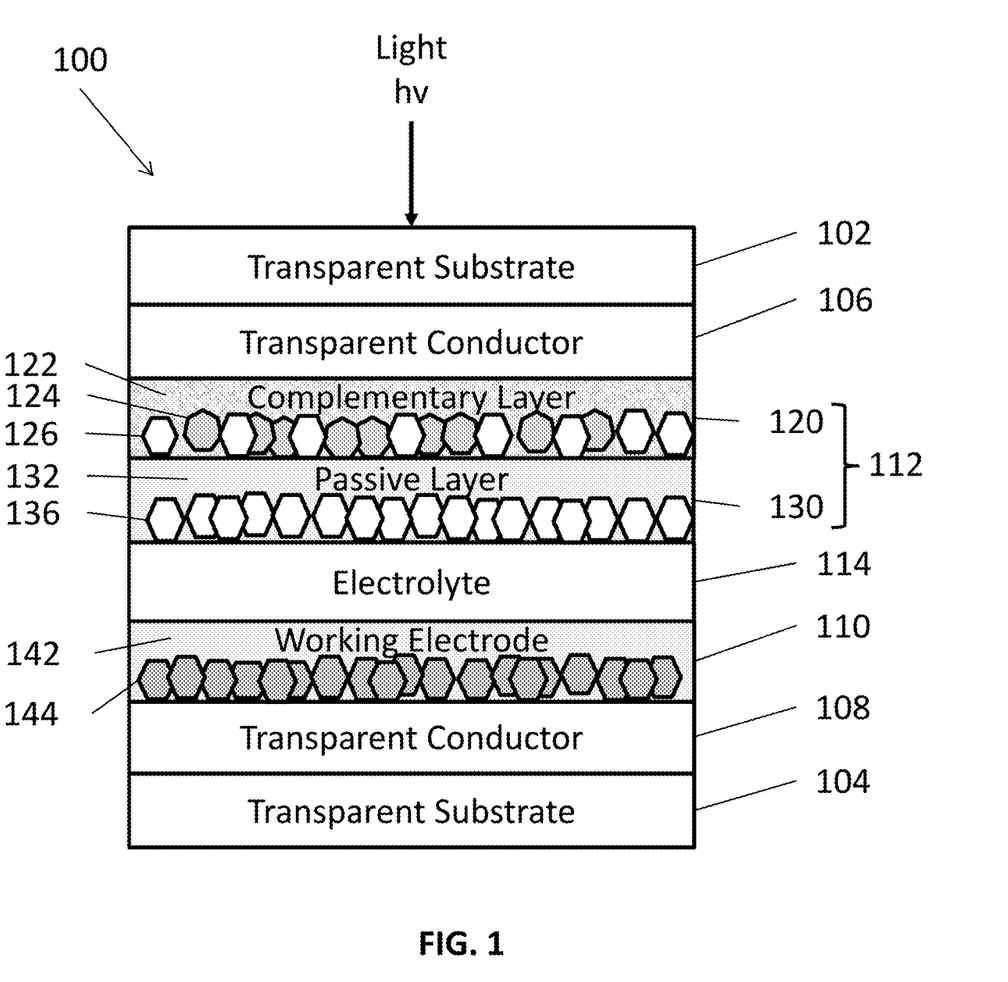
FIG. 1 is a schematic representation of an EC device, according to various embodiments of the present disclosure.

FIG. 1 is schematic view of an EC device 100, according to various embodiments of the present disclosure. It should be noted that the thickness of the layers and/or size of the components of the devices in FIG. 1 are not drawn to scale or in actual proportion to one another other, but rather are shown as representations. The EC device 100 may be utilized in various applications, such as in vehicle windows, architectural facades, roof glazing (skylights, canopies, etc.), and appliances.

As part of the EC device fabrication process, the working electrode, electrolyte, and counter electrode may be exposed to high temperatures as part of a bending, tempering, and/or quenching process. For example, the EC device layers may be exposed to temperatures of 650° C. or higher. The present inventors realized that at these temperatures, some of the layers of the EC device, and in particular nanoparticles in the working electrode, may undergo sintering or other undesirable crystallization changes or phase transitions. These changes may negatively affect the operation or efficiency of the EC device. As used herein, the term "nanoparticle" includes any suitable nanoparticle shape, such as a sphere, rod (e.g., nanorod or nanowire), a three dimensional polygon and/or an irregular shape.

Referring to FIG. 1, the EC device 100 may include opposing first and second substrates 102, 104. The first and second substrates 102, 104 may be transparent substrates, such as substrates formed of optically transparent glass or plastic. However, in some embodiments, the substrates 102, 104 may be omitted. For example, the EC device 100 may refer to a coating formed of the various layers of FIG. 1 that are disposed between the substrates 102, 104.

First and second transparent conductors 106, 108 may be respectively disposed on the first and second substrates 102, 104. A counter electrode 112 may be disposed on the first transparent conductor 106, and a working electrode 110 may be disposed on the second transparent conductor 108. An electrolyte 114 may be disposed on between the working electrode 110 and the counter electrode 112.

The first and second transparent conductors 106, 108 may be formed from transparent conducting films fabricated using inorganic and/or organic materials. For example, the transparent conductors 106, 108 may include inorganic films of transparent conducting oxide (TCO) materials, such as indium tin oxide (ITO) or fluorine doped tin oxide (FTO). In other examples, organic films of transparent conductors 106, 108 may include graphene and/or various polymers.

Electrodes

The counter electrode 112 should be capable of storing enough charge to sufficiently balance the charge needed to cause visible tinting to the nanostructured transition metal oxide nanostructures in the working electrode 110. In various embodiments, the counter electrode 112 may be formed as a conventional, single component film, a multilayer film, a nanostructured film, or a nanocomposite layer.

In some embodiments, the counter electrode 112 may include a complementary layer 120 and a passive layer 130. The complementary layer 120 may include metal oxide nanoparticles disposed in a metal oxide matrix 122. In various embodiments, the complementary layer 120 may optionally include a flux material, as discussed in detail below with regard to the passive layer 130.

The matrix 122 may be formed of a lithium metal oxide. For example, the matrix 122 may be formed of $LiNbO_3$ (lithium niobate), $Li_2WO_4$ (lithium tungstate), $LiTaO_3$ (lithium tantalite), combinations thereof, or the like.

The nanoparticles may include complementary nanoparticles 124 comprising at least one complementary (e.g., color balancing) material, which may be transparent to NIR radiation, but which may be oxidized in response to application of a bias, thereby causing absorption of visible light radiation. Examples of such complementary counter electrode materials may include nickel oxide (e.g., $NiO_x$, where $1 \leq x \leq 1.5$, such as NiO), $Cr_2O_3$, $MnO_2$, $FeO_2$, $CoO_2$, $RhO_2$, or $IrO_2$.

In some embodiments, the complementary layer 120 may include passive nanoparticles 126 comprising at least one passive material that is optically transparent to both visible and NIR radiation during the applied biases. The passive nanoparticles 126 may operate as conductivity enhancer.

Examples of passive nanoparticles 126 may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, $V_2O_5$, or mixtures thereof.

In some embodiments, the complementary layer 120 may include NiO complementary nanoparticles 124 and $In_2O_3$ passive nanoparticles 126 disposed in a $LiNbO_3$ matrix 122. The complementary layer 120 may also optionally comprise a flux material comprising a LiRAP material, as described below.

The passive layer 130 may include mixture of a flux material 132 and passive nanoparticles 136. Herein, when a flux material is included in a component of the EC device 100, the flux material may form a mixture with other elements of the component, such as nanoparticles, may form a coating on such nanoparticles (e.g., a core-shell structure), and/or may form a matrix in which nanoparticles are disposed. In some embodiments, the flux material and nanoparticles may be impregnated in a metal oxide matrix of a corresponding component.

The flux material 132 may comprise any suitable material that melts at a temperature that is lower than a sintering, crystallization, and/or phase transition temperature of metal oxide nanoparticles included in the EC device 100. For, example, the flux material 132 may have a melting temperature ranging from about 25° C. to about 500° C., such as from about 50° C. to about 450° C., or from about 100° C. to about 400° C. For example, the flux material 132 may be configured to melt when the EC device 100 is heated, such as during a tempering or heat-bending process applied to the EC device 100.

The flux material 132 may comprise a high temperature stable material (e.g. an inorganic metal salt) configured to suppress undesirable nanoparticle crystallization, sintering, and/or phase transitions of metal oxide nanoparticles during heating at temperatures of up to about 700° C.). Accordingly, the flux material 132 may be configured to protect the optical properties of the EC device during heat-bending and/or heat-treatment processes. The flux material 132 may be configured to solidify from a molten state, such as when the EC device 100 cools, without degrading the optical properties of the EC device 100.

In some embodiments, the flux material 132 may comprise a lithium salt material. For example, the flux material 132 may comprise a Li-rich anti-perovskite (LiRAP) material. An anti-perovskite is a compound having a crystal structure like a conventional perovskite but with the unit cell having the positive and negative species reversed. In a perovskite structure, the unit cell is face centered cubic. The negative atoms normally sit on the face centers and positive ions sit in the corners. Additionally, there will be a third type of atom, a cation, in the center of the cubic unit cell. In an antiperovskite structure, the locations of cations and anions are reversed. In the antiperovskite structure, of the type described herein, oxygen or sulfur atoms, for example, reside at centers of the unit cell, halogen atoms sit at corners of the unit cell, and lithium ions reside in the face centers of the unit cell. It is believed that the face centered species may be the most mobile species in the unit cell.

According to various embodiments, the flux material 132 may include a LiRAP material having the formula $Li_3OX$, where X may be a halogen or a combination of halogens. For example, X may be F, Cl, Br, I, or any combination thereof. In some embodiments, the LiRAP material may be $Li_3OI$. In some embodiments, the LiRAP material may also include one or more dopant species. In some embodiments, the LiRAP material may be aliovalently doped by replacing a first anion in the base structure with a second anion that has a valence more positive than that of the first atom.

The LiRAP material of the flux material 132 may be formed from constituent lithium salts. For example, the LiRAP material may be formed from an oxygen-containing lithium salt and a halogen salt of lithium. Examples of the oxygen-containing lithium salt include lithium hydroxide (LiOH) lithium acetate ($C_2H_3LiO_2$), lithium carbonate ($Li_2CO_3$), lithium oxide ($Li_2O$), lithium perchlorate ($LiClO_4$), lithium nitrate ($LiNO_3$), or any combination thereof. Examples of the halogen salt of lithium include lithium chloride (LiCl), lithium bromide (LiBr), lithium fluoride (LiF), lithium iodide (LiI), or any combination thereof. In some embodiments, the LiRAP material may be formed from LiOH and LiI.

The passive nanoparticles 136 may comprise at least one passive material that is optically transparent to both visible and NIR radiation during the applied biases. Examples of such passive counter electrode materials may include $CeO_2$, $CeVO_4$, $TiO_2$, indium tin oxide (ITO), $In_2O_3$ (Indium(III) oxide), $SnO_2$ (tin(IV) dioxide), manganese or antimony doped tin oxide, aluminum doped zinc oxide, ZnO (zinc oxide), gallium zinc oxide, indium gallium zinc oxide (IGZO), molybdenum doped indium oxide, $Fe_2O_3$, $V_2O_5$, or mixtures thereof.

In some embodiments, passive layer 130 may include a mixture of $CeO_2$ and $In_2O_3$ passive nanoparticles 136 and a LiRAP flux material 132. The passive layer 130 may also optionally include a $LiNbO_3$ matrix (not shown) in which the passive nanoparticles 136 and the flux material 132 are disposed.

In various embodiments, the working electrode 110 may include a mixture of a flux material 142 and an electrochromic material comprising doped or undoped transition metal oxide nanoparticles 144. The working electrode 110 may optionally include a lithium metal oxide matrix (not shown) that may include any of the materials as described above with respect to the matrix 122.

The flux material 142 may include any of the materials described above with respect to the flux material 132. In one embodiment, the flux material 142 may be in the form of a matrix layer that surrounds the nanoparticles 144. In other embodiments, the flux material 142 may surround the nanoparticles 144 in a core-shell configuration, with the flux material 142 forming shells around nanoparticle cores.

In the various embodiments, the transition metal oxide nanoparticles 144 may be a ternary composition of the type AxMzOy, where M represents a transition metal ion species in at least one transition metal oxide, and A represents at least one optional dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the transition metal oxide nanoparticles may include doped or undoped $WO_{3-x}$, $Cs_xWO_{3-x}$, and/or $NbO_x$, nanoparticles, where $0 \leq x \leq 0.33$, such as $0 \leq x \leq 0.1$. Thus, when x=0, $WO_{3-x}$ is $WO_3$.

In various embodiments, the at least one optional dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanoparticle shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the solid state electrolyte 114 and the transition metal oxide nanostructures of the working electrode 110, as a result of the applied voltage. Specifically, the application of voltage within the particular range may cause the second dopant species to intercalate and deintercalate the transition metal oxide nanostructures. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species. For example, if the transition metal oxide nanoparticles 144 are $WO_{3-x}$ nanoparticles, the dopant may be Li intercalated from the electrolyte 114.

In various embodiments, the shape, size, and doping levels of transition metal oxide nanoparticles 144 may be tuned to further contribute to the spectral response by the device. For instance, the use of rod versus spherical nanoparticles 144 may provide a wider level of porosity, which may enhance the switching kinetics. Further, a different range of dynamic plasmonic control may occur for nanostructures with multiple facets, such as at least 20 facets.

Various embodiments may also involve alternation of the nanoparticles 144 that form the working electrode 110. For example, the nanostructures may be nanoparticles of various shapes, sizes and/or other characteristics that may influence the absorption of NIR and/or visible light radiation. In some embodiments, the nanoparticles 144 may be isohedrons that have multiple facets, preferably at least 20 facets.

In some embodiments, the transition metal oxide nanoparticles 144 may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 110. For example, the working electrode 110 may include both cubic and hexagonal cesium doped tungsten oxide bronze nanoparticles. In alternative embodiments, the working electrode 110 may include either cubic or hexagonal cesium doped tungsten oxide nanoparticles. For example, the working electrode 110 may include cubic cesium-doped tungsten oxide (e.g., $Cs_1W_2O_{6-x}$) nanoparticles and amorphous niobium oxide nanoparticles or hexagonal cesium-doped tungsten oxide (e.g. $Cs_{0.29}W_1O_3$) nanoparticles without niobium oxide. In alternative embodiments, the working electrode 110 may include undoped cubic tungsten oxide (e.g., $WO_{3-x}$) nanoparticles where $0 \leq X \leq 0.1$.

In some embodiments, at least one nanoparticle amorphous transition metal oxide may be included in the working electrode 110 in addition to the doped-transition metal oxide nanoparticles 144. An example of such material in the working electrode 110 may be, but is not limited to, nano structured amorphous niobium oxide, such as NbO, $NbO_2$, or $Nb_2O_5$. In an alternative embodiment, the working electrode 110 may further include a matrix material, such as lithium niobate.

The nanoparticles 144 of the working electrode 110 may modulate transmittance of NIR and visible radiation as a function of applied voltage by operating in two different modes. For example, a first mode may be a highly solar transparent ("bright") mode in which the working electrode 110 is transparent to NIR radiation and visible light radiation. A second mode may be a visible blocking ("dark") mode in which the working electrode 110 absorbs radiation in the visible spectral region and at least a portion of the NIR spectral region. In an example, application of a first voltage having a negative bias may cause the electrochromic device to operate in the dark mode, blocking transmittance of visible and NIR radiation at wavelengths of around 780-2500 nm. In another example, application of a second voltage having a positive bias may cause the electrochromic device to operate in the bright mode, allowing transmittance of radiation in both the visible and NIR spectral regions. In various embodiments, the applied voltage may be between −2V and 2V. For example, the first voltage may be −2V, and the second voltage may be 2V.

Electrolyte

According to various embodiments of the present disclosure, the electrolyte may be a gel electrolyte. Herein, the term "gel", as used herein with respect to the electrolyte 114, refers to a substantially dilute cross-linked system that exhibits no flow when in the steady-state. By weight, a gel may be mostly liquid, but may behave like a solid due to a three-dimensional cross-linked network within the liquid. The crosslinking within the fluid may give a gel its structure (hardness) and contributes to the adhesive stick (tack).

In various embodiments, the gel electrolyte 114 may include a polymer network (e.g. backbone) and an ionically conductive phase disposed therein. The gel electrolyte 114 may optionally include at least one additive. The gel electrolyte 114 may have an electrical conductivity at room temperature ranging from about 1 μS/cm to about 10 mS/cm. The gel electrolyte 114 may have a modulus of elasticity that ranges from about 10 kPa to about 50 MPa. The gel electrolyte 114 may have shear strength when disposed on a transparent conductive oxide substrate that ranges from about 1 psi to about 1000 psi.

According to various embodiments, the polymer network may include crosslinked monomers and/or oligomers. Herein, "monomers" monomers refer to both monomers and oligomers. For example, the polymer network may include crosslinked structural monomers and adhesion promoting monomers (e.g., adhesion promoters). The ionically conductive phase may be disposed within the polymer network.

In some embodiments, the structural monomers may include polyurethane acrylate oligomers. The polyurethane acrylate may be formed from liquid polymer precursors, such as aliphatic ethers, aliphatic esters, aromatic ethers, and/or aromatic esters. In other embodiments, the polymer network may also include other structural monomers. For example, other structural monomers that may be included in the polymer network include, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), or the like.

The adhesion promoting monomers may include, for example, isobornyl acrylate (IBOA), ethoxylated nonylphenol acrylate, poly(ethylene glycol) diacrylate (PEGDA), trimethylolpropane triacrylate (TMPTA), ethoxyethoxyethyl acrylate, tripropylene glycol diacrylate (TPGDA), butyl acrylate (BA), hexanediol diacrylate (HDDA), and mixtures thereof. The adhesion promoting monomers may be configured to promote electrolyte adhesion between the structural monomers, and between the gel electrolyte 112 and an adjacent substrate, such as the working electrode 110 and/or the counter electrode 112.

The ionically conducting phase may include a plasticizer, an electrolyte salt, and/or an initiator. In some embodiments, the ionically conductive phase may include one or more optional additives, such as sacrificial redox agents (SRA).

In some embodiments, the plasticizer may include glymes (tetraglyme, triglyme, diglyme etc.), sulfolane, propylene carbonate, ethylene carbonate, ionic liquids (1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl)imide, etc.), N,N-dimethylacetamide, and mixtures thereof. In an embodiment, the plasticizer may include at least one of tetraglyme and an alkyl hydroperoxide.

In various embodiments, the plasticizer may include an ionic liquid. The ionic liquid may include, for example, N-methyl-N-butylpyrrolidinium bis(trifluoromethylsulfonyl)imide (Py14TFSI), imidazolium bis(trifluoromethylsulfonyl)imide ([Im][TFSI]), or a combination thereof.

In some embodiments, the plasticizer may act as a solvent and/or may include an additional solvent. For example, the plasticizer may include tetraglyme, sulfolane, propylene carbonate, or mixtures thereof mixed with the ionic liquid. In some embodiments, the gel electrolyte 114 may initially contain an additional solvent, such as butanol, which may be evaporated off during assembly of, or after the electrochromic device is assembled.

In some embodiments, the electrolyte salt may contain, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an example embodiment, the electrolyte salt may contain a lithium salt and/or a sodium salt.

In various embodiments, the lithium salt may be, for example, lithium bis(trifluoromethanesulfonyl)imide (LiTFSI), lithium tetrafluoroborate ($LiBF_4$), lithium bis(oxalate)borate (LiBOB), lithium hexafluorophosphate ($LiPF_6$), lithium difluorooxalatoborate (LiDFOB), or mixtures thereof.

The ionically conductive phase may include an additive such as one or more SRAs. Suitable classes of SRAs may include, but are not limited to, alcohols, nitrogen heterocycles, alkenes, and functionalized hydrobenzenes. Specific examples of suitable SRAs may include benzyl alcohol, 4-methylbenzyl alcohol, 4-methoxybenzyl alcohol, dimethylbenzyl alcohol (3,5-dimethylbenzyl alcohol, 2,4-dimethylbenzyl alcohol, etc.), other substituted benzyl alcohols, indoline, 1,2,3,4-tetrahydrocarbazole, N,N-dimethylaniline, 2,5-dihydroanisole, methylthiol alcohol, or the like. In various embodiments, the SRA molecules may create an air stable layer that does not require an inert environment to maintain charge.

The gel electrolyte 114 may be formed by curing a gel electrolyte precursor composition. The gel electrolyte precursor composition, which may also be referred to as a "precursor composition", may be cured by the application of heat and/or UV light. Herein, the "gel electrolyte precursor composition" and "precursor composition" may refer to flowable liquid compositions that are not cross-linked, or are partially crosslinked (e.g., at least 50% of the crosslinkable polymers and/or oligomers remain un-crosslinked), but that may be cured to form a gel electrolyte.

The precursor composition may include polymer network precursors (e.g., structural monomers and adhesion promoting monomers used to form the polymer network) and an ionically conducting phase. The ionically conducting phase may include a plasticizer, an electrolyte salt, an initiator, optionally one or more additives, and any combinations thereof.

In various embodiments, the curing may be facilitated by the initiator. The initiator may include, for example, 2,2-Dimethoxy-2-phenylacetophenone, phenylphosphineoxide, benzoyl peroxide, or a mixture thereof.

In some embodiments, the precursor composition may include a viscosity controlling agent, such as a thickener, to increase the viscosity thereof. For example, the precursor composition may have a viscosity ranging from about 1,000 cP to about 90,000 cP, at room temperature. For example, the viscosity may range from about 10,000 cP to about 80,000 cP, such as from about 25,000 cP to about 60,000 cP.

For example, if the viscosity is less than about 1,000 cP, the thickness of the gel electrolyte 114 may be inconsistent. For example, the center of the electrolyte 114 may be thinner than edge regions of the electrolyte, which may complicate a subsequent lamination process using to construction an EC device 100, by forming gaps between the electrolyte and an adjacent substrate laminated thereto. On the other hand, when the viscosity is greater than about 90,000 cP, process bubbles in the electrolyte 114 may be difficult to remove and it may be difficult to apply a sealant around the electrolyte 114 during subsequent lamination processes.

EC Device Characteristics and Manufacturing

In certain instances, it is desirable to heat treat (e.g., thermally temper, heat strengthen and/or heat shape) coated articles, such as EC glass articles, for purposes of tempering, shaping, or the like. In certain situations, designers of coated articles often strive for a combination of high visible transmission, substantially neutral color, low emissivity (or emittance), and low sheet resistance ($R_S$). High visible transmission for example may permit coated articles to be more desirable in certain window applications, whereas low-emissivity (low-E) and low sheet resistance characteristics permit such coated articles to block significant amounts of IR radiation, so as to reduce, for example, undesirable heating of vehicle or building interiors.

In applications such as vehicle glass, a visible transmission of at least 70%, or even at least 75%, may be required, and the coated article may require bending as well as heat-treatment. The bending is often performed by allowing a coated glass article to sag into a curved mold while being heat-treated in a known manner. The heat-treatment of such coated articles typically requires the use of temperature(s) of at least 580° C., such as least about 600° C., or at least 620° C., for about 5-10 minutes or more. For example, the heat-treatment may include heat-tempering or heat-strengthening.

Unfortunately, heat treating conventional EC coatings may result in sintering of the nanoparticles, which may result in a loss of optical properties. In addition, too much heating often causes conventional EC coatings to suffer damage such as mottling. Mottling defects essentially result from cracking of one or more layers of the EC coating. Mottling may also occur when a conventional EC coating is bent to a significant extent, such as during thermal bending processes.

Herein, "optical properties" of an EC device may refer to the visible and/or NIR light transmission amount of the EC device in a bright mode and/or a dark mode. The "EC transmittance difference" of an EC device may refer to a difference between the bright mode light transmission and the dark mode light transmittance of the EC device. "Electrical properties" of an EC device may refer to the electrical resistance of the EC device. Further, "heat shaping" may refer to any thermal process by which the shape of a glass substrate, and/or elements disposed thereon, is changed. For example, heat shaping may include sag bending/forming, press bending/forming, or the like to form a bent or formed glass.

Figure 2:
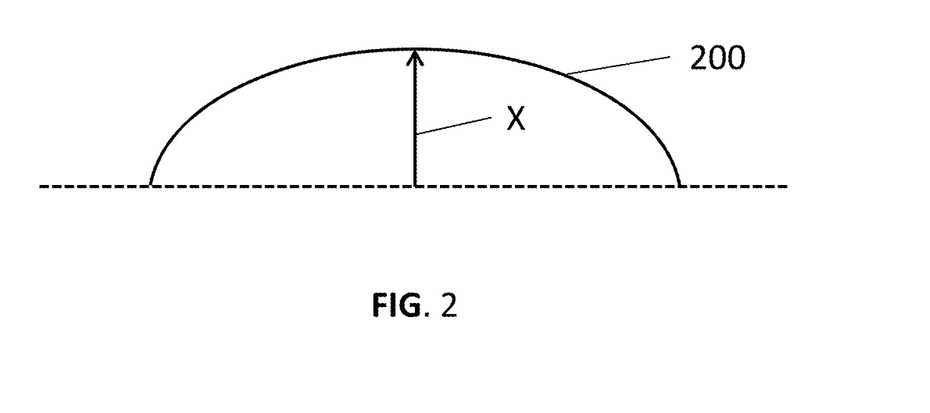
FIG. 2 is a cross-sectional view of an EC device showing a degree of bending applied by a heat-bending process.

FIG. 2 is a cross-sectional view of an EC device 200 provided for the purpose of explaining the degree of bending applied by a heat-bending process. The EC device 200 may have a structure similar to that of the EC device 100.

Referring to FIG. 2, parameter "X" represents the amount of bend in the EC device 200, and is known as a centerline convex value. The centerline convex value X is the distance between the apex of the interior surface of the EC device 200 drawn straight down to a line (see the dotted line in FIG. 2) connecting the two ends of the EC device 200. This centerline convex value X is representative of the amount of bend (or depth of bend) in the EC device 200, wherein the higher the value X, the higher the amount of bend in the EC device 200.

In some embodiments, the EC device 200 may be heat-shaped (e.g., heat-bent or heat-formed) to a centerline convex value X ranging from about 5 mm to about 30 mm, such as from about 6 mm to about 25 mm, from about 7 mm to about 20 mm, from about 8 mm to about 15 mm, or from about 9 to about 14 mm In some embodiments, the EC device 200 may have a compound shape rather than a shape of a section of a sphere. In these embodiments, the EC device 200 may have a radius of curvature of at least 5 mm, such as a radius of curvature ranging from about 5 mm to about 15 mm, or from about 5 mm to about 10 mm, in addition or instead of the above described centerline convex value X.

In other embodiments, the EC device may also be heat-treated, such as, heat-strengthened or heat-tempered. The EC device 200 may be bent to such an extent without having a significant reduction in optical and/or electrical properties and/or without suffering significant or fatal mottling damage.

For example, in some embodiments, after shaping and/or heat-treating, the EC device 200 may retain at least about 85%, such as about 90%, about 95%, about 97%, or about 98% of its pre-shaping and/or pre-heat treating optical, electrochromic, and/or electrical properties. For example, the EC device may have a bright mode transmittance and/or a dark mode transmittance that is within about +/−15% or about +/−10% or about +/−5% of a bright mode transmittance and/or a dark mode transmittance of the EC device prior to shaping and/or heat-treating. In other embodiments, the EC variation of the EC device 200, i.e., a total amount of difference in transmittance between the bright mode and the dark mode may be within about +/−15% or about +/−10% or about +/−5% of the EC variation of the EC device prior to shaping and/or heat-treating of the EC device 200.

The EC device 200 may have an electrical resistivity that is within about +/−15% or about +/−10% or about +/−5% of the electrical resistivity of the EC device prior to shaping and/or heat-treating. Likewise, the EC device 200 may have an amount of mottling that is within about +/−15% or about +/−10% or about +/−5% of the amount of mottling of the EC device prior to shaping and/or heat-treating.

At least a portion of the EC device 200 (e.g., the entire heated EC device 200 or one electrode on the substrate that is heated separately from the rest of the EC device) has a value of ΔE does not increase by more than 10 after the heating. As used herein, ΔE is a measure of change in visual perception of two given colors (i.e., a metric for understanding how the human eye perceives color difference) given by the following "Delta E 76" formula in the CIELAB color space:

$$\Delta E_{ab}^* = \sqrt{(L_2^* - L_1^*)^2 + (a_2^* - a_1^*)^2 + (b_2^* - b_1^*)^2}$$

Thus, ΔE values of less than 1 is considered not perceptible to the human eye, values of 1-2 are perceptible through close observation and values of 2-10 are perceptible at glance, as defined at http://zschuessler.github.io/DeltaE/learn/. Preferably, the value of ΔE does not increase by more than 2, such as by 0.1 to 0.99 after the heating.

Figure 3:
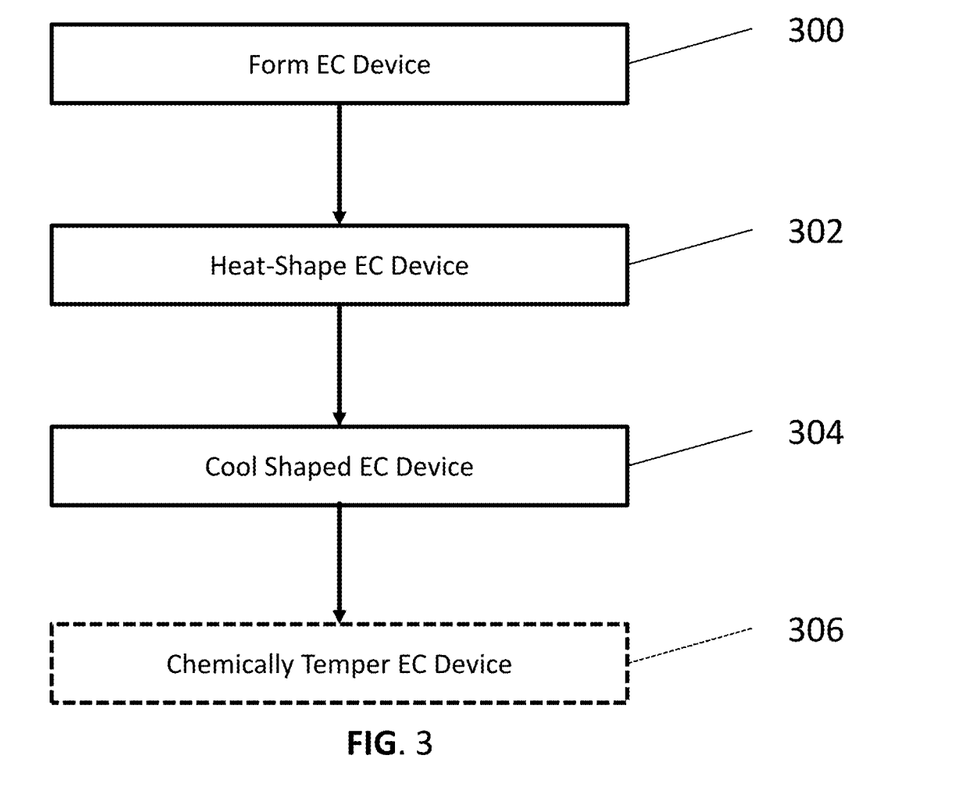
FIGS. 3 and 4 are block diagrams showing methods of forming EC device, according to various embodiments of the present disclosure.

FIG. 3 is a block diagram illustrating a method of forming a bent EC device, according to various embodiments of the present disclosure. Referring to FIG. 3, in step 300, the method includes forming at least part of an EC device, such as the working electrode, the counter electrode, or the entire EC device 100 of FIG. 1. The components of the EC device may be formed using various processes, such as any suitable coating and/or deposition processes.

For example, step 300 may include forming a first transparent conductor disposed on a first glass substrate, forming a working electrode disposed on the first transparent conductor, and optionally also forming an electrolyte disposed on the counter electrode, forming a counter electrode disposed on the electrolyte, and forming a second transparent conductor disposed on the counter electrode. A second glass substrate may optionally be disposed on the second transparent conductor.

In some embodiments, step 300 may include forming a first transparent conductor on a first glass substrate, forming a working electrode on the first transparent conductor, and optionally also forming a second transparent conductor on a second glass substrate, forming a counter electrode on the second transparent conductor, and forming an electrolyte between the working electrode and the counter electrode.

In various embodiments, step 300 may include coating an electrolyte precursor solution on the first or second substrates, and then laminating the first and second substrates together. The precursor solution may be cured before or after the lamination, to form the electrolyte. In some embodiments, the precursor solution may be coated on the working electrode and then cured, and then the counter electrode and/or the second transparent conductor may be formed on the cured electrolyte. In other embodiments, the electrolyte precursor solution may be coated on a third substrate, cured, and then removed from the third substrate as a free-standing electrolyte. The free-standing electrolyte may then be inserted between the first and second substrates.

In other embodiments, the electrodes may be formed by other processes. For example, one or both of the electrodes and/or coatings disposed thereon may be formed by physical or chemical vapor deposition processes. For example, the working electrode may be formed by solution deposition and the counter electrode may be formed by sputtering.

In step 302, the method may include heat-shaping the EC device. For example, step 302 may include heating the entire EC device, or just one of the electrodes thereof disposed on a glass substrate, to a processing temperature near the softening point of the glass substrates, such as a temperature ranging from about 550° C. to about 850° C., or from about 580° C. to about 750° C., for a time period of about 5-10 minutes or more. The heating may include radiant heating, convective heating, millimeter microwave heating, combinations thereof, or the like.

During the heating, the EC device may be disposed over a curved bending mold and allowed to sag, so as to assume the curvature of the mold. A press bending or microwave bending apparatus may optionally be used to bend and/or heat the EC device. During step 302, the flux is melted to a liquid state and prevents or reduces nanoparticle sintering and the formation of cracks in the electrode(s) of the EC device.

In step 304, the method may include gradually cooling the shaped EC device. For example, the EC device may be cooled via passive cooling. The gradual cooling may result in heat-strengthening of the substrates. The heat-strengthened substrates may have a surface compression of 3,500 to 7,500 psi. After cooling, the EC device may be removed from the mold. During step 304, the flux solidifies into a solid state around the nanoparticles.

The method may optionally include step 306, where the bent EC device is chemically tempered using an ion exchange process. For example, the bent EC device may be disposed in a salt bath, wherein sodium ions present in the surface of the glass substrates are exchanged with larger ions, such as potassium ions of the bath, resulting in compression of the glass substrates. For example, the process may result in tempered glass having either a minimum surface compression of 69 MPa (10,000 psi), or an edge compression of not less than 67 MPa (9,700 psi).

Figure 4:
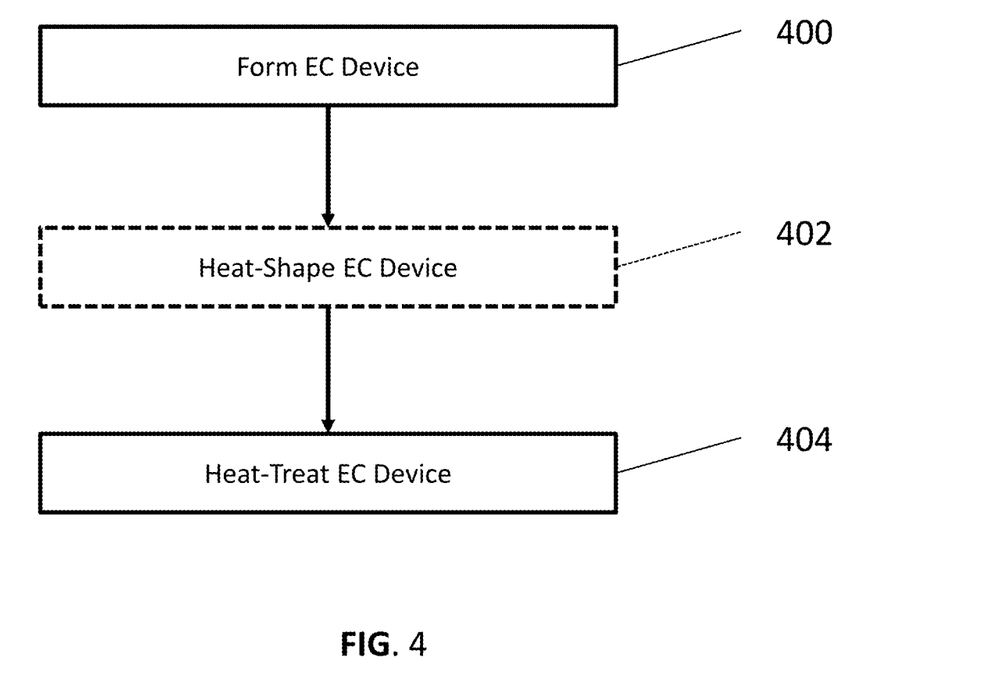

FIG. 4 is a block diagram illustrating a method of tempering an EC device, according to various embodiments of the present disclosure. Referring to FIG. 4, in step 400, the method includes forming an EC device, such as part of or the entire EC device 100 of FIG. 1. The EC device may be formed as discussed above with regard to step 300 of the method of FIG. 3.

In some embodiments, the method may optionally include a heat-bending step 402. Step 402 may include heat-bending as described in step 302 of the method of FIG. 3. In particular, the EC device may be heat-bent, and then the bent EC device may be subjected to heat tempering in step 404.

In step 404, the method may include heat-treating the glass substrates of the EC device. For example, step 404 may include heat-tempering or heat-strengthening the glass substrates. Both processes may include heating the EC device to a tempering temperature above the glass transition temperature of the glass substrates. For example, the EC device may be heated to about 620° C., which is considered the industry standard tempering temperature. During step 404, the flux melts and prevents or reduces nanoparticle sintering and film cracking and/or mottling.

In the heat-tempering process, the EC device may be quenched to complete the tempering process. For example, the EC device could be rapidly cooled in about 10 seconds or less, such as about 5 seconds or less, using high pressure air cooling or liquid quenching. During the quenching process, the outer surfaces of glass substrates are cooled more quickly than the centers thereof, resulting in tempered glass. For example, the process may result in tempered glass having either a minimum surface compression of 69 MPa (10,000 psi), or an edge compression of not less than 67 MPa (9,700 psi). The flux solidifies around the nanoparticles during the quenching process.

In the heat-strengthening process, the EC device may be cooled at a slower rate than in the heat-tempering. The heat-strengthening process may result in glass substrates that are approximately twice as strong as annealed, or untreated, glass.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An electrochromic (EC) device comprising:
    an optically transparent first substrate;
    a working electrode disposed on the first substrate and comprising electrochromic nanoparticles and a flux material having a melting point ranging from about 25° C. to about 500° C.;
    an electrolyte disposed on the working electrode; and
    a counter electrode comprising a passive layer disposed on the electrolyte and comprising passive nanoparticles and the flux material, and a complementary layer disposed on the passive layer and comprising complementary nanoparticles and a matrix comprising a lithium metal oxide,
    wherein the flux material is configured to prevent or reduce sintering of the nanoparticles at a temperature of up to about 700° C., and
    wherein the complementary layer further comprises a flux material comprising a lithium-rich anti-perovskite (LiRAP) material represented by the formula $Li_3OX$, wherein X is F, Cl, Br, I, or any combination thereof.

2. The EC device of claim 1, wherein in the working electrode:
    the flux material forms a matrix in which the nanoparticles are disposed;
    the flux material and the nanoparticles form a composite; or
    the flux material forms shells around the nanoparticles.

3. The EC device of claim 1, wherein the flux material comprises a lithium-rich anti-perovskite (LiRAP) material represented by the formula $Li_3OX$, wherein X is F, Cl, Br, I, or any combination thereof.

4. The EC device of claim 1, wherein:
    the nanoparticles comprise $WO_{3-x}$, $Cs_xWO_{3-x}$, or $NbO_x$, where $0 \leq x \leq 0.33$; and
    the electrolyte comprises a gel electrolyte comprising polyurethane acrylate and a lithium salt.

5. The EC device of claim 1, wherein the complementary nanoparticles comprise $NiO_x$, where $1 \leq x \leq 1.5$, $Cr_2O_3$, $MnO_2$, $FeO_2$, $CoO_2$, $RhO_2$, $IrO_2$, or a combination thereof.

6. The EC device of claim 5, wherein the complementary nanoparticles comprise $NiO_x$, where $1 \leq x \leq 1.5$.

7. The EC device of claim 1, wherein the passive nanoparticles comprise $CeO_2$ nanoparticles and $In_2O_3$ nanoparticles.

8. The EC device of claim 1, wherein the lithium metal oxide of the matrix comprises $LiNbO_3$, $Li_2WO_4$, $LiTaO_3$, or any combination thereof.

9. The EC device of claim 1, wherein the passive layer further comprises a matrix comprising $LiNbO_3$, $Li_2WO_4$, $LiTaO_3$, or any combination thereof.

10. The EC device of claim 1, further comprising a glass second substrate disposed on the counter electrode,
    wherein the EC device is heat-bent or heat-formed, and has at least one of a radius of curvature value of at least 5 mm or a centerline convex value X of at least 5 mm, wherein the centerline convex value X is the distance between the apex of the interior surface of the EC device and a line connecting two opposing ends of the EC device.

11. The EC device of claim 10, wherein:
    the first substrate is a glass substrate; and
    the EC device comprises part of a vehicle window.

12. A method of making an electrochromic (EC) device, the method comprising:
    forming at least a portion of an EC device on an optically transparent first substrate, the EC device comprising nanoparticles and a flux material having a melting point ranging from about 25° C. to about 500° C.;
    heating the nanoparticles such that the flux material melts and prevents or reduces sintering of the nanoparticles; and
    cooling the nanoparticles such that the flux material solidifies around the nanoparticles,
    wherein:
    the first substrate comprises a glass substrate;
    the electrochromic nanoparticles comprise $WO_{3-x}$, $Cs_x$, $CO_{3-x}$, or $NbO_x$, where $0 \leq x \leq 0.33$; and
    the flux material comprises a lithium-rich anti-perovskite (LiRAP) material represented by the formula $Li_3OX$, wherein X is F, Cl, Br, I, or any combination thereof.

13. The method of claim 12, wherein the heating comprises bending or forming the EC device in a mold such that the EC device has at least one of a radius of curvature of at least 5 mm or a centerline convex value X of at least 5 mm, and wherein the centerline convex value X is the distance between the apex of the interior surface of the EC device and a line connecting two opposing ends of the EC device.

14. The method of claim 12, wherein the cooling comprises quenching the EC device to heat temper the first substrate.

15. The method of claim 12, wherein the heating and the cooling heat-strengthens the first substrate.

16. The method of claim 12, wherein:
the nanoparticles are electrochromic nanoparticles disposed in a working electrode with the flux material; and
the method further comprises disposing an electrolyte on the working electrode and disposing a counter electrode on the electrolyte before or after the heating, the counter electrode comprising:
a passive layer disposed on the electrolyte and comprising passive nanoparticles and a matrix comprising a lithium metal oxide; and
a complementary layer disposed on the passive layer and comprising complementary nanoparticles, passive nanoparticles, and the flux material.

17. A method of making an electrochromic (EC) device, the method comprising:
forming at least a portion of an EC device on an optically transparent first substrate, the EC device comprising electrochromic nanoparticles disposed in a working electrode with a flux material having a melting point ranging from about 25° C. to about 500° C.;
heating the nanoparticles such that the flux material melts and prevents or reduces sintering of the nanoparticles; and
cooling the nanoparticles such that the flux material solidifies around the nanoparticles,
disposing an electrolyte on the working electrode and disposing a counter electrode on the electrolyte before or after the heating, the counter electrode comprising:
a passive layer disposed on the electrolyte and comprising passive nanoparticles and a matrix comprising a lithium metal oxide; and
a complementary layer disposed on the passive layer and comprising complementary nanoparticles, passive nanoparticles, and the flux material.

18. An electrochromic (EC) device comprising:
an optically transparent first substrate;
a working electrode disposed on the first substrate and comprising electrochromic nanoparticles and a flux material having a melting point ranging from about 25° C. to about 500° C.;
an electrolyte disposed on the working electrode; and
a counter electrode comprising a passive layer disposed on the electrolyte and comprising passive nanoparticles and the flux material, and a complementary layer disposed on the passive layer and comprising complementary nanoparticles and a matrix comprising a lithium metal oxide,
wherein the flux material is configured to prevent or reduce sintering of the nanoparticles at a temperature of up to about 700° C., and
wherein the lithium metal oxide of the matrix comprises $LiNbO_3$, $Li_2WO_4$, $LiTaO_3$, or any combination thereof.

19. An electrochromic (EC) device comprising:
an optically transparent first substrate;
a working electrode disposed on the first substrate and comprising electrochromic nanoparticles and a flux material having a melting point ranging from about 25° C. to about 500° C.;
an electrolyte disposed on the working electrode; and
a counter electrode comprising a passive layer disposed on the electrolyte and comprising passive nanoparticles and the flux material, and a complementary layer disposed on the passive layer and comprising complementary nanoparticles and a matrix comprising a lithium metal oxide,
wherein the flux material is configured to prevent or reduce sintering of the nanoparticles at a temperature of up to about 700° C., and
wherein the passive layer further comprises a matrix comprising $LiNbO_3$, $Li_2WO_4$, $LiTaO_3$, or any combination thereof.

* * * * *